(12) United States Patent
Kodama et al.

(10) Patent No.: US 7,430,327 B2
(45) Date of Patent: Sep. 30, 2008

(54) IMAGE PROCESSING APPARATUS, IMAGE PROCESSING PROGRAM, AND STORAGE MEDIUM

(75) Inventors: Taku Kodama, Kanagawa (JP); Junichi Hara, Kanagawa (JP); Nekka Matsuura, Kanagawa (JP); Toshio Miyazawa, Kanagawa (JP); Yasuyuki Nomizu, Kanagawa (JP); Hiroyuki Sakuyama, Tokyo (JP); Yasuyuki Shinkai, Kanagawa (JP); Takanori Yano, Kanagawa (JP); Takayuki Nishimura, Tottori (JP)

(73) Assignee: Ricoh Company, Ltd., Tokyo (JP)

( * ) Notice: Subject to any disclaimer, the term of this patent is extended or adjusted under 35 U.S.C. 154(b) by 903 days.

(21) Appl. No.: 10/716,463

(22) Filed: Nov. 20, 2003

(65) Prior Publication Data

US 2004/0151386 A1 Aug. 5, 2004

(30) Foreign Application Priority Data

Nov. 20, 2002 (JP) ............................... 2002-336390

(51) Int. Cl.
*G06K 9/36* (2006.01)
(52) U.S. Cl. ....................................... 382/232; 382/240
(58) Field of Classification Search ................. 382/232, 382/233, 252, 275, 240, 274; 375/240.27, 375/240.29; 358/1.9, 1.16
See application file for complete search history.

(56) References Cited

U.S. PATENT DOCUMENTS

| 6,571,071 | B2 | 5/2003 | Kanoshima et al. ........... 399/79 |
| 6,674,982 | B2 | 1/2004 | Saitoh et al. ................. 399/110 |
| 2001/0050778 | A1 | 12/2001 | Fukuda et al. ............... 358/1.9 |
| 2002/0159644 | A1 | 10/2002 | Sekuyama .................... 382/240 |
| 2003/0095272 | A1 | 5/2003 | Nomizu ....................... 358/1.9 |
| 2003/0137695 | A1 | 7/2003 | Nomizu ....................... 358/1.16 |
| 2004/0151386 | A1 | 8/2004 | Kodama et al. |
| 2005/0154562 | A1 | 7/2005 | Matsuura et al. |

FOREIGN PATENT DOCUMENTS

| JP | 07-162691 | 6/1995 |
| JP | 2002-314999 | 10/2002 |

OTHER PUBLICATIONS

U.S. Appl. No. 10/390,193, filed Mar. 14, 2003, Unknown.
U.S. Appl. No. 10/390,263, filed Mar. 14, 2003, Unknown.

(Continued)

*Primary Examiner*—Duy M Dang
(74) *Attorney, Agent, or Firm*—Oblon, Spivak, McClelland, Maier & Neustadt, P.C.

(57) ABSTRACT

A image processing apparatus transmits a codestream through a transmission path, the codestream being created from an image by dividing the image into rectangular portions and performing a discrete wavelet transform, a quantization and an entropy encoding for the respective rectangular portions of the image. The image processing apparatus comprises an error resilience inserting unit which inserts error resilience to respective code data of the rectangular portions prior to the entropy coding, and an error resilience setting unit which sets intensities of the error resilience inserted to the respective code data for the error resilience inserting unit, so that the error resilience intensities are different according to base units of the respective code data.

20 Claims, 16 Drawing Sheets

OTHER PUBLICATIONS

U.S. Appl. No. 10/372,479, filed Feb. 21, 2003, Unknown.
U.S. Appl. No. 10/348,444, filed Jan. 21, 2003, Nomizu.
U.S. Appl. No. 10/283,350, filed Oct. 30, 2002, Nomizu.
U.S. Appl. No. 10/082,308, filed Feb. 26, 2002, Sakuyama.
U.S. Appl. No. 09/847,192, filed Feb. 2, 2001, Fukuda et al.
U.S. Appl. No. 09/725,569, filed Nov. 30, 2000, Namazuka et al.
U.S. Appl. No. 09/748,240, filed Dec. 27, 2000, Yoshizawa et al.
U.S. Appl. No. 09/748,262, filed Dec. 27, 2000, Namizuka et al.
U.S. Appl. No. 09/770,214, filed Jan. 29, 2001, Oteki et al.
U.S. Appl. No. 09/772,945, filed Jan. 31, 2001, Oteki et al.
U.S. Appl. No. 09/846,244, filed May 2, 2001, Shogi et al.
U.S. Appl. No. 09/855,665, filed May 16, 2001, Yamagata et al.
U.S. Appl. No. 09/912,364, filed Jul. 26, 2001, Sakuyama.
U.S. Appl. No. 09/940,589, filed Aug. 29, 2001, Inoue et al.
U.S. Appl. No. 09/964,584, filed Sep. 28, 2001, Shinkai et al.
U.S. Appl. No. 10/102,633, filed Mar. 22, 2002, Ameyama et al.
U.S. Appl. No. 10/156,093, filed May 29, 2002, Sano et al.
U.S. Appl. No. 10/164,545, filed Jun. 10, 2002, Sano et al.
U.S. Appl. No. 10/272,857, filed Oct. 18, 2002, Watanabe et al.
U.S. Appl. No. 10/379,533, filed Mar. 6, 2003, Takeyama et al.
U.S. Appl. No. 10/716,463, filed Nov. 20, 2003, Kodama et al.

FIG.3
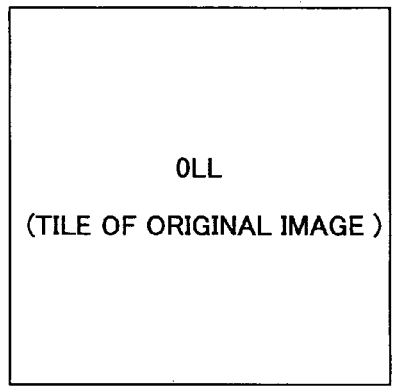
DECOMPOSITION LEVEL-0
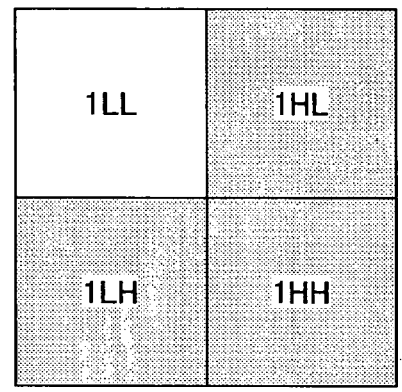
DECOMPOSITION LEVEL-1
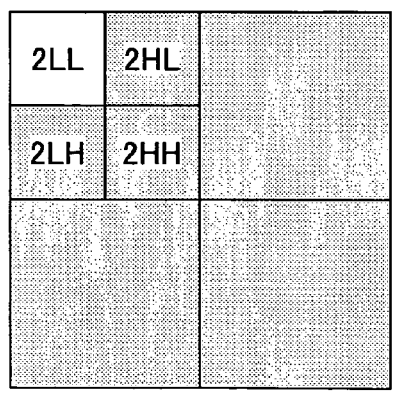
DECOMPOSITION LEVEL-2
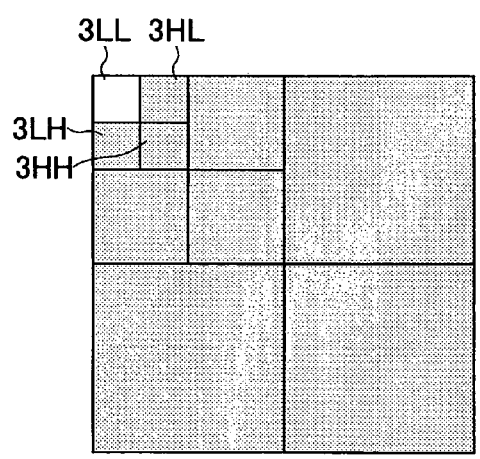
DECOMPOSITION LEVEL-3

1 FRAME (IMAGE)  1 FRAME (IMAGE)  ......  1 FRAME (IMAGE)

| D0 | V0 | D1 |
|----|----|----|
| H0 | X  | H1 |
| D2 | V1 | D3 |

FIG.18

| TILE NO. / LAYER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 12 | 2 | 2 | 2 | 2 | 2 | 6 | 6 | 2 | 2 | 6 | 6 | 2 | 2 | 2 | 2 | 2 |
| 11 | 2 | 2 | 2 | 2 | 2 | 6 | 6 | 2 | 2 | 6 | 6 | 2 | 2 | 2 | 2 | 2 |
| 10 | 2 | 2 | 2 | 2 | 2 | 6 | 6 | 2 | 2 | 6 | 6 | 2 | 2 | 2 | 2 | 2 |
| 9 | 2 | 2 | 2 | 2 | 2 | 6 | 6 | 2 | 2 | 6 | 6 | 2 | 2 | 2 | 2 | 2 |
| 8 | 1 | 1 | 1 | 1 | 1 | 5 | 5 | 1 | 1 | 5 | 5 | 1 | 1 | 1 | 1 | 1 |
| 7 | 1 | 1 | 1 | 1 | 1 | 5 | 5 | 1 | 1 | 5 | 5 | 1 | 1 | 1 | 1 | 1 |
| 6 | 1 | 1 | 1 | 1 | 1 | 4 | 4 | 1 | 1 | 4 | 4 | 1 | 1 | 1 | 1 | 1 |
| 5 | 1 | 1 | 1 | 1 | 1 | 4 | 4 | 1 | 1 | 4 | 4 | 1 | 1 | 1 | 1 | 1 |
| 4 | 0 | 0 | 0 | 0 | 0 | 3 | 3 | 0 | 0 | 3 | 3 | 0 | 0 | 0 | 0 | 0 |
| 3 | 0 | 0 | 0 | 0 | 0 | 3 | 3 | 0 | 0 | 3 | 3 | 0 | 0 | 0 | 0 | 0 |
| 2 | 0 | 0 | 0 | 0 | 0 | 2 | 2 | 0 | 0 | 2 | 2 | 0 | 0 | 0 | 0 | 0 |
| 1 | 0 | 0 | 0 | 0 | 0 | 2 | 2 | 0 | 0 | 2 | 2 | 0 | 0 | 0 | 0 | 0 |

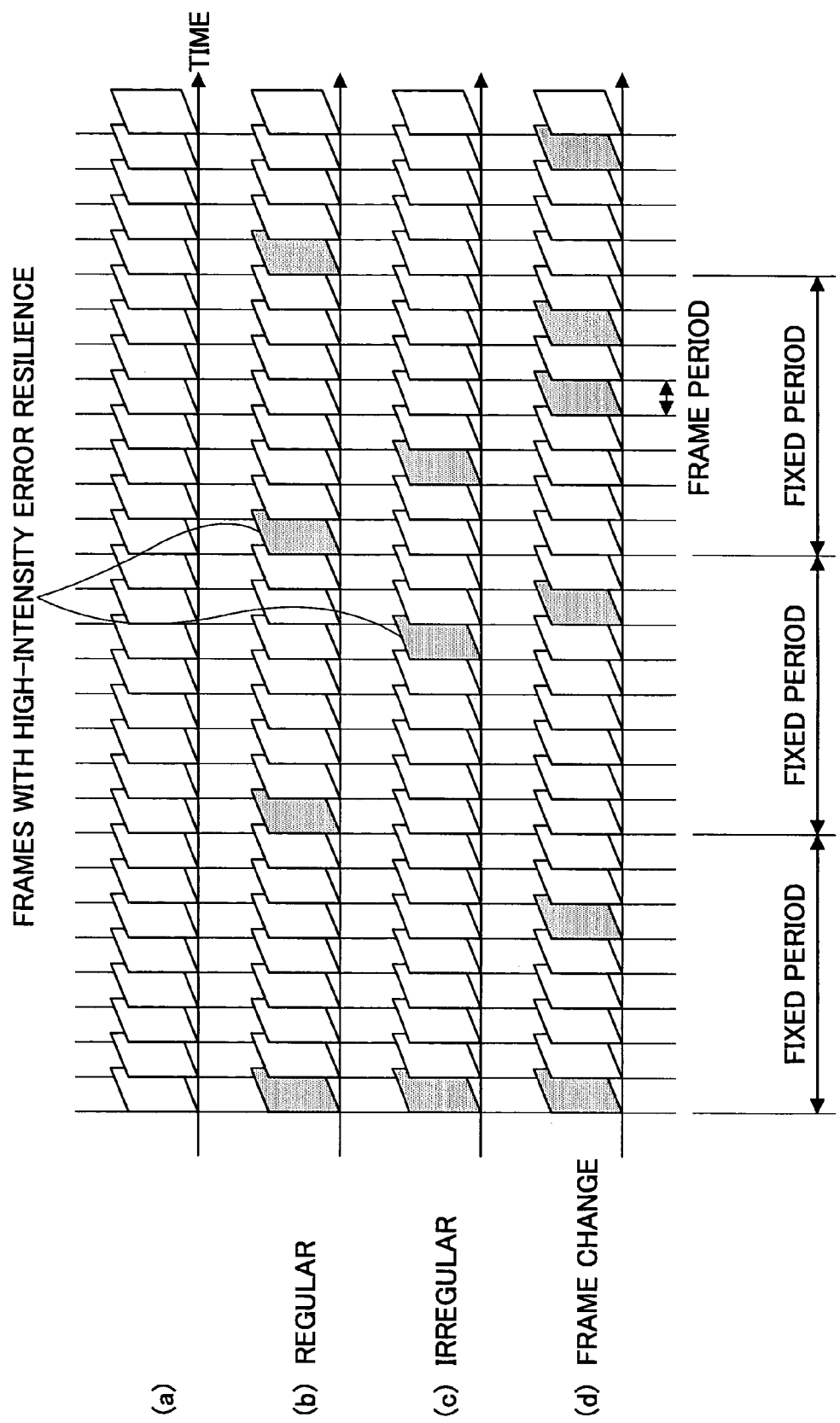

IMAGE PROCESSING APPARATUS, IMAGE PROCESSING PROGRAM, AND STORAGE MEDIUM

BACKGROUND OF THE INVENTION

1. Field of the Invention

The present invention relates to an image processing apparatus, such as a server on the Internet, which transmits encoded image data to a destination device (such as a client) through the Internet, and also relates to an image processing program and a storage medium which cause a computer to execute the same processing as the transmission of encoded image data to the destination device.

2. Description of the Related Art

With the recent development of image input/output technology, the demand for high-resolution image processing is increasing. For example, in a case of digital cameras that are image input devices, the manufacture of highly efficient, inexpensive charge-coupled devices (CCD) having 3 million pixels or more will progress, and they have come to be widely used also in the products of a reasonable price. And the manufacture of the products having 5 million pixels or more is also promised. For the time being, the upward tendency of the number of pixels (or the resolution) will continue.

On the other hand, as for the image output/display devices, miniaturization and low-pricing of the products in the soft-copy field, such as flat-panel displays, CRTs (cathode-ray tube displays), LCDs (liquid-crystal displays), PDPs (plasma displays), etc., and the products in the hard-copy field, such as laser printers (including multi-function peripherals (MFP)), ink-jet printers, sublimated type printers, etc. are also remarkable.

The marketing of such high performance, low-price image input/output products enables the popularization of high-resolution images to start, and it is expected that the demand of the highly minute image increases in all the fields of the image input/output technology from now on.

Development of the network-related technology including personal computers or the Internet systems actually accelerates such a trend increasingly. Especially recently, the spreading speed of mobile devices, such as cellular phones and notebook personal computers, is very high, and the opportunity to transmit or receive a high-resolution image by using a communication device from various locations on the network increases rapidly.

By taking into consideration the above matter, it appears that it is inevitable that the request of making it easier the handling of image compression and expansion technology becomes stronger in the future.

In recent years, a new method called JPEG2000 which can restore a high-resolution image encoded with a high compression ratio is being standardized as one of the image encoding/decoding methods that attain the above-mentioned request.

According to the JPEG2000, it is possible to perform compression/expansion processing of an image by dividing the image into rectangular portions (tile components) under the environment with memory devices having a small storage capacity. Namely, each tile component becomes the base unit at the time of performing the compression/expansion processing, and the compression/expansion operation for every tile component can be performed independently.

For example, when downloading a desired image data from a server onto a certain user's personal computer through the Internet, or when carrying out printing out of an image data from a certain user's personal computer to a printer, such as MFP, the codestream which is produced through the compression coding according to the JPEG2000 is transmitted through a transmission path over the network to the destination device.

In the transmission of such image data, there is the possibility that the data may be lost due to the packet loss etc. depending on the communication conditions, and, once the packet data is lost, displaying or printing of the image of the subsequent packets will be impossible. Especially when the transmission paths of the wireless communications are used, the possibility of data loss is very high. The latest local area networks mostly use the wireless-LAN equipment, and the same problem will arise.

Taking into account the above cases, the JPEG2000 is provided to use also the technology which gives error resilience to the codestream such that the reproduction of the encoded image is not significantly influenced by a bit error even if it occurs in the codestream. Concerning the error resilience insertion, there are several kinds of error resilience functions which are specified in the JPEG2000. For example, one error resilience function uses the entropy coding, and another function uses the packet.

Therefore, when transmitting the codestream, which is produced by the compression encoding, through the transmission paths, it is effective to give such error resilience to the codestream in order to prevent the data loss as much as possible.

However, when giving error resilience in the conventional method, uniform error resilience is given to the entire image (one image) of the codestream. Giving error resilience makes it possible to easily prevent the data loss, but the amount of image data being transmitted becomes large, which causes the load of the network to be increased.

Accordingly, there is the problem that the transmission of image data to which error resilience is given will require longer time, which causes the time needed for the displaying or printing of the image to be increased. Moreover, the necessity of re-transmission of the image data will arise more frequently.

SUMMARY OF THE INVENTION

An object of the present invention is to provide an improved image processing apparatus in which the above-described problems are eliminated.

Another object of the present invention is to provide an image processing apparatus which enables transmission of the codestream, produced by the compression encoding according the JPEG2000, with the necessary permissible quality of image ensured, and without increasing the transmission load and the transmission time so much.

The above-mentioned objects of the present invention are achieved by an image processing apparatus which transmits a codestream through a transmission path, the codestream being created from an image by dividing the image into rectangular portions and performing a discrete wavelet transform, a quantization and an entropy encoding for the respective rectangular portions of the image, the image processing apparatus comprising: an error resilience inserting unit inserting error resilience to respective code data of the rectangular portions prior to the entropy coding; and an error resilience setting unit setting intensities of the error resilience inserted to the respective code data for the error resilience inserting unit, so that the error resilience intensities are different according to base units of the respective code data.

The above-mentioned objects of the present invention are achieved by an image processing program embodied therein for causing a computer of an image processing apparatus to execute an image processing method which transmits a codestream through a transmission path, the codestream being created from an image by dividing the image into rectangular portions and performing a discrete wavelet transform, a quantization and an entropy encoding for the respective rectangular portions of the image, the method comprising steps of: inserting error resilience to respective code data of the rectangular portions prior to the entropy coding; and setting intensities of the error resilience inserted to the respective code data for the error resilience inserting step, so that the error resilience intensities are different according to base units of the respective code data.

The above-mentioned objects of the present invention are achieved by a computer-readable storage medium storing a program embodied therein for causing a computer of an image processing apparatus to execute an image processing method which transmits a codestream through a transmission path, the codestream being created from an image by dividing the image into rectangular portions and performing a discrete wavelet transform, a quantization and an entropy encoding for the respective rectangular portions of the image, the method comprising steps of: inserting error resilience to respective code data of the rectangular portions prior to the entropy coding; and setting intensities of the error resilience inserted to the respective code data for the error resilience inserting step, so that the error resilience intensities are different according to base units of the respective code data.

According to the image processing apparatus of the present invention, it is possible to give several kinds of the error resilience functions according to the JPEG 2000, to the codestream. It is also possible to set up the divided rectangular portions (the tiles) of the codestream such that a high-intensity error resilience is attached to the code data belonging to a certain region of the image while a low-intensity error resilience is attached to the code data belonging to other regions of the image. The image processing apparatus of the present invention can realize the transmission of the codestream, produced by the compression encoding according to the JPEG2000, through the transmission path over the network with the necessary permissible quality of image being ensured and without increasing the transmission load and the transmission time so much.

BRIEF DESCRIPTION OF THE DRAWINGS

Other objects, features and advantages of the present invention will be apparent from the following detailed description when read in conjunction with the accompanying drawings.

FIG. 3 is a diagram for explaining the hierarchical coding algorithm and the JPEG2000 algorithm.

FIG. 18 is a diagram for explaining an example of error resilience setting for each tile number.

FIG. 19 is a diagram for explaining an example of error resilience inserted in a sequence of frames of moving pictures.

DETAILED DESCRIPTION OF PREFERRED EMBODIMENTS

For the sake of providing good understanding of the subject matter of the invention, a description will be given of the outline of the hierarchical coding algorithm and the JPEG2000 algorithm, prior to the description of the preferred embodiments of the invention.

Figure 1:
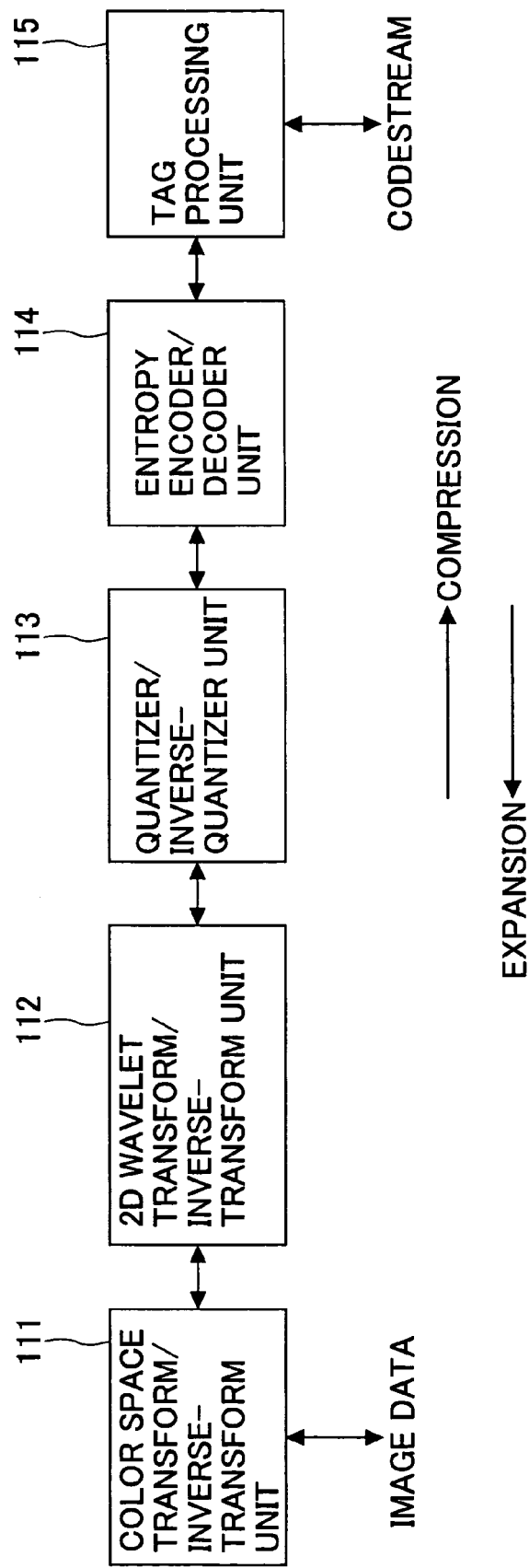
FIG. 1 is a block diagram of a baseline image processing system which utilizes the hierarchical coding algorithm which is the fundamental function of the JPEG2000 method.

FIG. 1 shows a baseline image processing system which utilizes the hierarchical coding algorithm which is the fundamental function of the JPEG2000 method.

The image processing system of FIG. 1 is composed of a set of function blocks which include a color-space transform (or inverse transform) unit 111, a 2-dimensional wavelet transform (or inverse transform) unit 112, a quantization (or inverse quantization) unit 113, an entropy coding (or decoding) unit 114, and a tag processing unit 115.

In the case of a conventional JPEG algorithm, the discrete cosine transform (DCT) is used. In the case of the system of FIG. 1, the discrete wavelet transform (DWT) is used as the hierarchical coding algorithm by the 2-dimensional wavelet transform (or inverse-transform) unit 112.

Compared with the DCT, the DWT has the advantage that the quality of image in high compression ranges is high. This is because the JPEG2000 algorithm, which is the succeeding algorithm of JPEG, has adopted the DWT.

Moreover, with the hierarchical coding algorithm, another difference is that the system of FIG. 1 is provided with the tag processing unit 115 as an additional function block, in order to perform tag (headers, SOC, EOC) formation and codestream formation at the last stage of the system.

In the tag processing unit 115, at the time of image compression operation, compressed image data are generated as a codestream, and the interpretation of the codestream required for image expansion is performed at the time of image expansion operation.

The JPEG2000 method provides various convenient functions with the codestream. For example, as shown in FIG. 3, compression/expansion operation of the still image can be freely stopped at an arbitrary stage (decomposition level) corresponding to the octave division in the DWT in the block base.

The color-space transform (or inverse-transform) unit 111 is connected to the I/O part of the original image in many cases.

The color-space transform unit 111 is equivalent to, for example, the part which performs the color-space conversion to the RGB colorimetric system which includes each component of R(red)/G(green)/B(blue) of the primary-colors system, or the YUV or YCbCr calorimetric system which includes each component of Y(yellow)/M(magenta)/C(cyanogen) of the complementary-colors system from the YMC colorimetric system.

Moreover, the color-space inverse-transform unit 111 is equivalent to the inverse color-space conversion that is the reverse processing to the above color-space conversion.

Next, a description will be given of the JPEG2000 algorithm.

Figure 2:
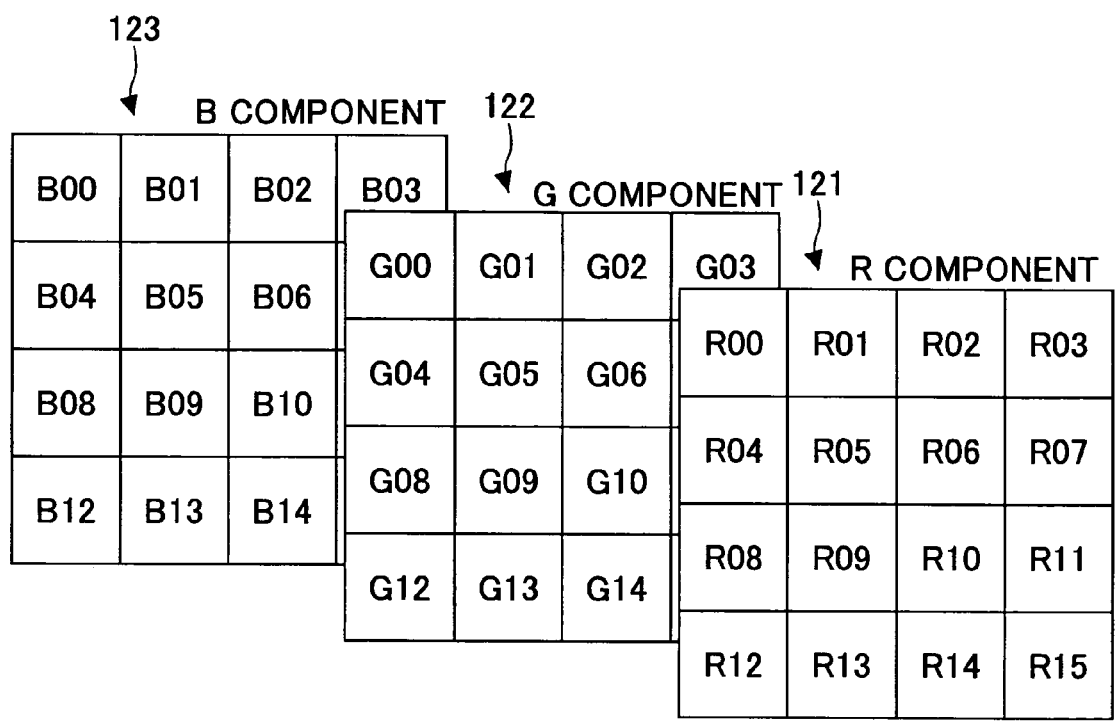
FIG. 2 is a diagram for explaining the hierarchical coding algorithm and the JPEG2000 algorithm.

Generally, the color image is divided into rectangular portions where each component (RGB primary-colors system) of the original picture is arranged as shown in FIG. 2.

The rectangular portion is generally called the block or the tile, and it is common to call it the tile as for this divided rectangular portion according to the JPEG2000. It is hereinafter made to describe such a divided rectangular portion as being the tile. In the example of FIG. 2, each component 121, 122 or 123 is divided in each direction into 4×4 rectangular portions. Each of the 16 pieces of the rectangles is called the tile.

Each tile of the component 121, 122 or 123 (which is, in the example of FIG. 2, R00, R01, . . . , R15, G00, G01, . . . , G15, B00, B01, . . . , B15) serves as the base unit at the time of performing the compression or expansion process of the image data. Therefore, the compression or expansion operation of the image data is performed independently for every component and for every tile.

After the data of each tile of each component 121, 122 or 123 are inputted into the color-space transform (or inverse-transform) unit 111 of FIG. 1, and color-space transform is performed at the time of the coding of the image data, 2-dimensional wavelet transform (forward transform) is performed by the 2-dimensional wavelet transform 112, and space division is carried out in the frequency domain.

FIG. 3 shows the sub-band in each decomposition level in case the number of decomposition levels is 3.

The tile of the original image is initially obtained. To the original image tile (OLL) (decomposition level 0), 2-dimensional wavelet transform is performed and the sub band (1LL, 1HL, 1LH, 1HH) shown in the decomposition level 1 is separated.

Subsequently, to low-frequency component 1LL in this layer, 2-dimensional wavelet transform is performed and the sub band (2LL, 2HL, 2LH, 2HH) shown in the decomposition level 2 is separated.

Similarly, 2-dimensional wavelet transform is performed also to low-frequency component 2LL, and the sub band (3LL, 3HL, 3LH, 3HH) shown in the decomposition level 3 is separated one by one.

As shown in FIG. 3, the sub band set as the object of the coding in each decomposition level is indicated by the dotted area.

For example, when the number of decomposition levels is set to 3, the sub band components (3HL, 3LH, 3HH, 2HL, 2LH, 2HH, 1HL, 1LH, 1HH) indicated by the dotted area serve as the candidate for the coding, and the sub band component 3LL is not coded.

Subsequently, the bit set as the object of the coding in the turn of the specified coding is appointed, and the context is generated from the bit of the object bit circumference by the quantization (inverse quantization) unit 113 shown in FIG. 1.

The wavelet coefficients after the processing of the quantization are divided into the rectangles which are called the precincts and not overlapping for each of the sub bands. This is introduced in order to use the memory efficiently by implementation.

Figure 4:
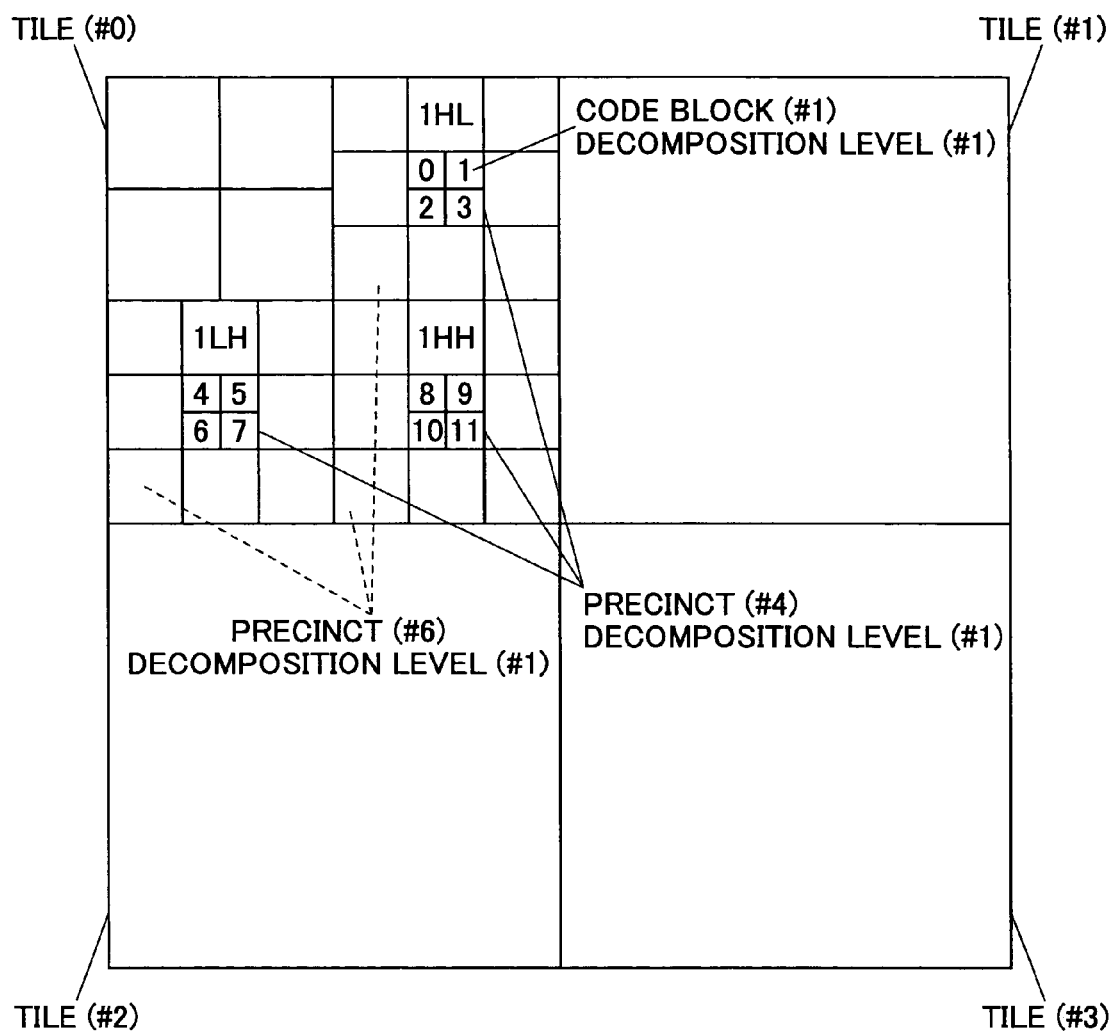
FIG. 4 is a diagram for explaining the hierarchical coding algorithm and the JPEG2000 algorithm.

As shown in FIG. 4, one precinct includes the three rectangular portions which are spatially in agreement.

Furthermore, each precinct is divided into the code block of the rectangle not overlapping. This serves as the base unit at the time of performing entropy coding.

The wavelet coefficients after the discrete wavelet transform (DWT) is performed may be subjected to the quantization and entropy encoding. However, according to the JPEG2000 algorithm, it is also possible that the wavelet coefficients are divided into the bit-plane components, and the ordering of the bit-plane components is performed for each pixel or code block, in order to raise the efficiency of encoding.

Figure 5:
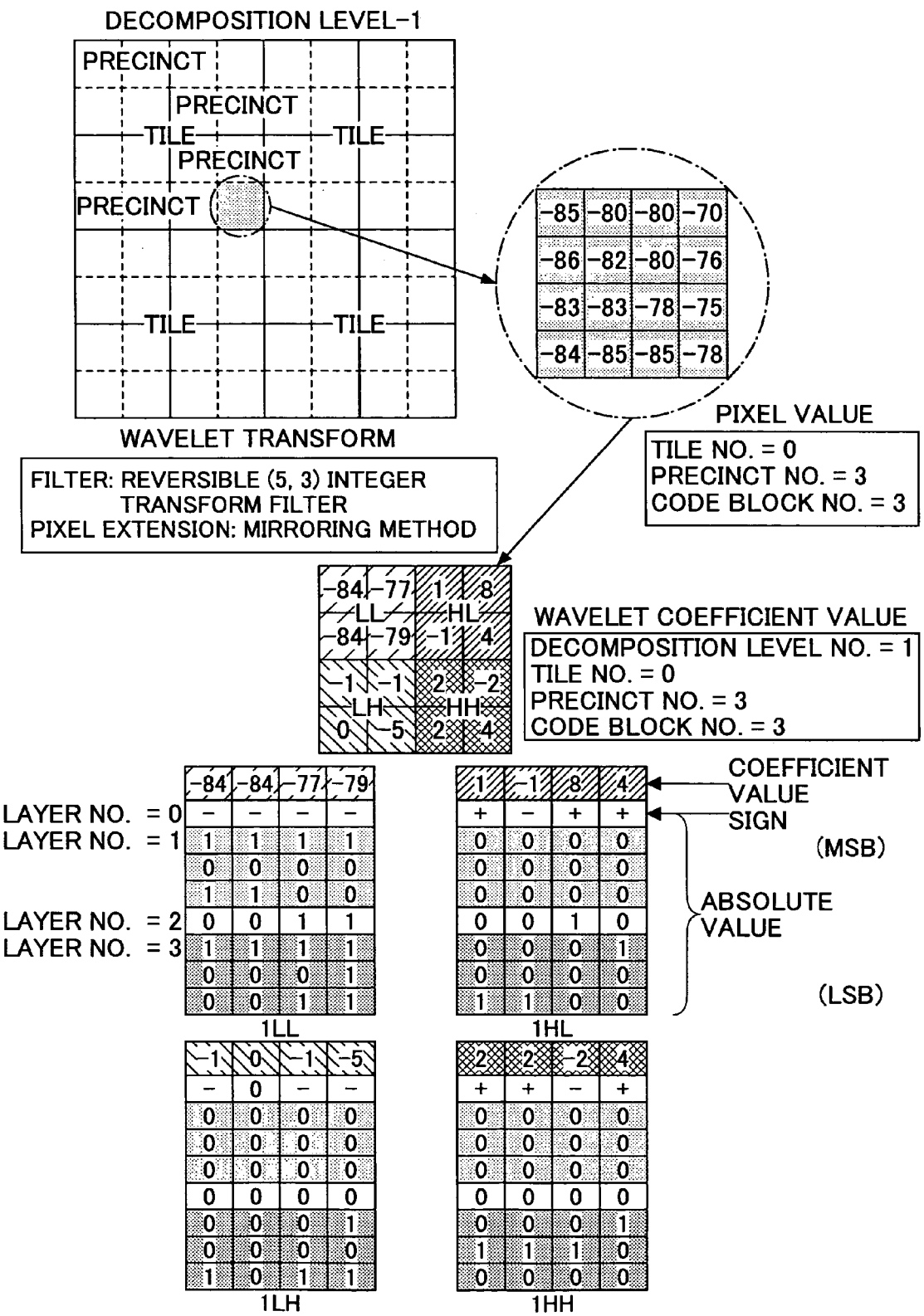
FIG. 5 is a diagram for explaining the hierarchical coding algorithm and the JPEG2000 algorithm.

FIG. 5 shows the procedure of the wavelet coefficient division and the bit-plane component ordering. In the example of FIG. 5, the original image containing 32×32 pixels is divided into four tile components each containing 16×16 pixels. The magnitude of each precinct of decomposition level 1 is 8×8 pixels, and the magnitude of each code block of decomposition level 1 is 4×4 pixels. The precinct number and the code block number are allocated in the order of the raster scanning. The mirroring method is used for the pixel extension beyond the tile component. The wavelet transform is performed with the reversible (5, 3) integer transform filter, so that the wavelet coefficients of decomposition level 1 are obtained.

The outline of the typical layers with respect to the tile number 0/the precinct number 3/the code block number 3 is also shown in FIG. 5. The structure of the layers can be easily understood by viewing the wavelet coefficients in the horizontal direction (the bit-plane direction). A single layer is composed of a number of the bit-plane components. In the example of FIG. 5, each of the layer number 0, 1, 2, 3 is composed of the three bit-plane components 1, 3, 1. The layer containing the bit-plane components nearer to the LSB (least significant bit) is subjected to the quantization earlier, while the layer containing the bit-plane components nearer to the MSB (most significant bit) is not subjected to the quantization and remains unchanged. The method which truncates the layer near to the LSB is called the truncation, and it is possible to control the quantization ratio appropriately by using the truncation.

In the entropy coding/decoding unit 114 shown in FIG. 1, probability presumption from the context and the object bit enables the encoding of the tile of each component to be performed. In this way, coding processing of the tiles about all the components of the original image is performed.

Figure 6:
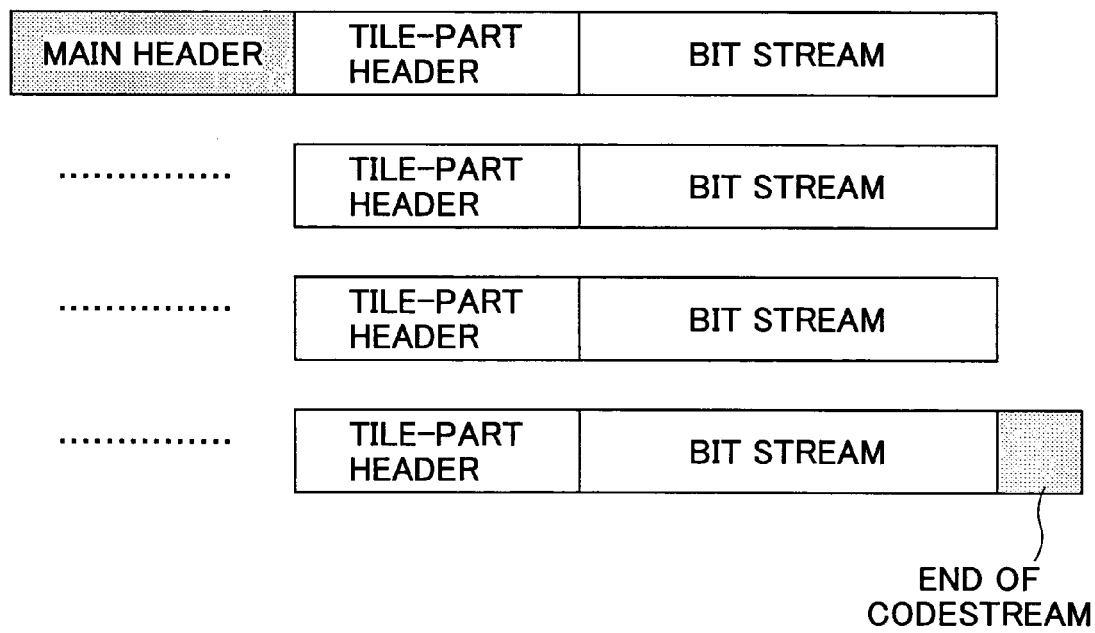
FIG. 6 is a diagram for explaining the structure of one frame of the codestream produced by a tag processing unit in the system of FIG. 1.

FIG. 6 shows the composition of one frame of the codestream that is produced by the tag processing unit 115.

The tag information, called the main header, is disposed at the beginning of this codestream. After the main header, the tile-part header of the codestream (bit stream) of each tile, and the coding data of each tile are continuously disposed. And, the tag (end of codestream) is disposed at the end of the codestream.

On the other hand, at the time of decoding of the codestream, the image data is generated from the codestream of each tile of each component which is the reverse processing to the coding of the image data.

In this case, the tag processing unit 115 interprets the tag information added to the codestream that is inputted from the exterior, decomposes the codestream into the codestream of each tile of each component, and performs decoding processing for every codestream of each tile of each of that component.

While the location of the bit set as the object of decoding in the turn based on the tag information in the codestream is defined at this time, the context is generated in quantization and the inverse quantization unit 113 from the row of the circumference bit (decoding is already completed) of the object bit position.

In the entropy coding/decoding unit 114, the codestream is decoded by probability presumption from this context, the object bit is generated, and it is written in the location of the object bit.

Thus, the space division of the decoded data is carried out for every frequency band, each tile of each component of the image data is restored in this by performing the 2-dimensional wavelet inverse transformation at the 2-dimensional wavelet inverse-transform unit 112.

The restored data are changed into the image data of the original colorimetric system by the color-space inverse-transform unit 111.

In the entropy coding/decoding unit 114 (shown in FIG. 1), probability presumption performs coding to the tile of each component from the context and the object bit. In this way, coding processing is performed per tile about all the components of the subject-copy image.

Finally, the tag processing unit 115 performs processing which attaches the tag to the coded data from the entropy coding unit to form the codestream.

The structure of the codestream is briefly shown in FIG. 6. As shown in FIG. 6, the tag information called header is added to the head of the codestream, and the head of the partial tile which constitutes each tile, and the coded data of each tile continues after that.

And the tag is again put on the termination of the codestream. Moreover, FIG. 7 shows the codestream structure where the packet in which the encoded wavelet coefficient value was accommodated was expressed for every sub band.

Figure 7:
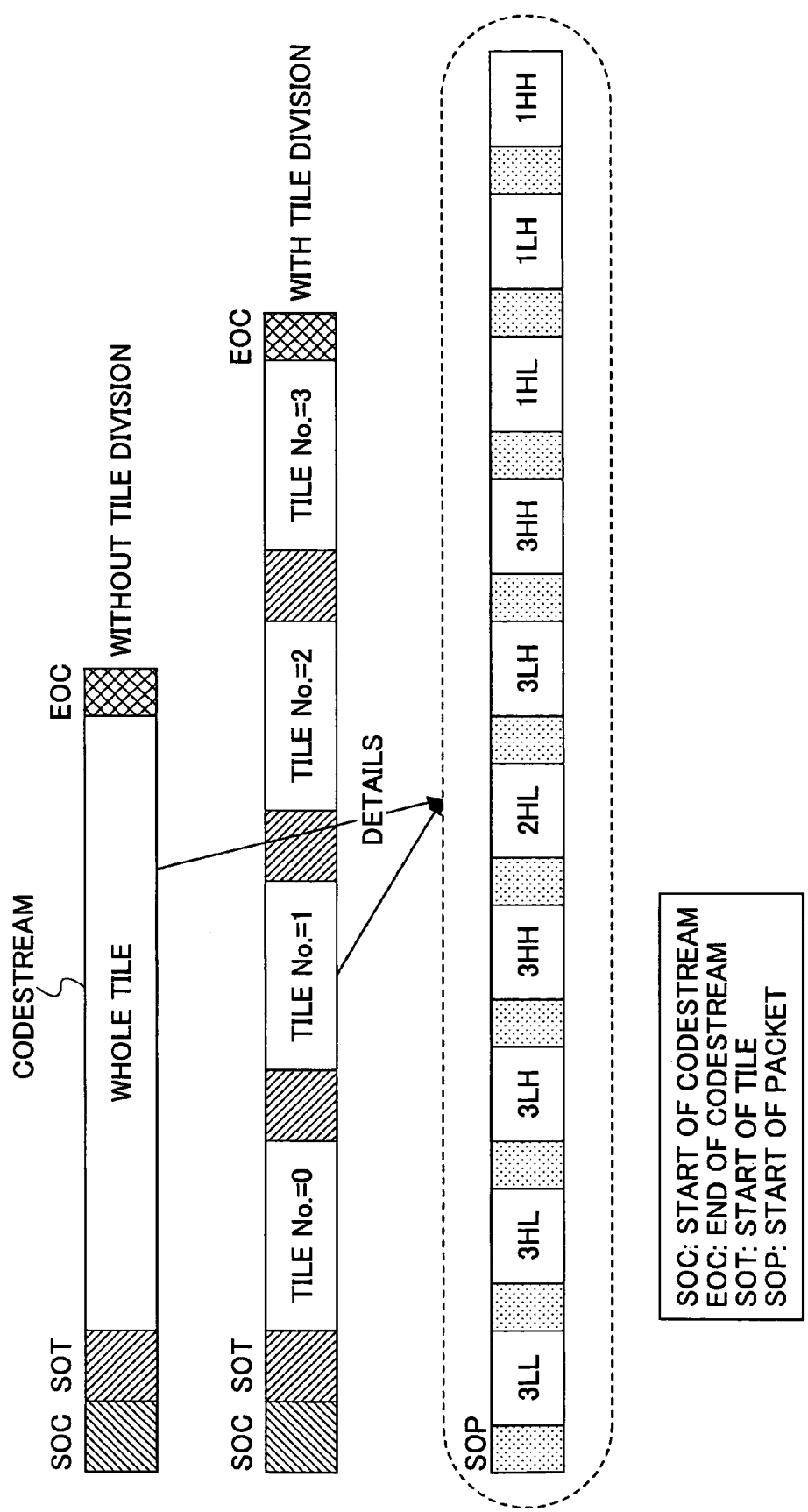
FIG. 7 is a diagram for explaining the structure of one packet containing wavelet coefficients after the discrete wavelet transform.

Whether it performs division processing by the tile as shown in FIG. 7, or it does not perform division processing by the tile, it will have the same packet sequence structure.

On the other hand, at the time of the decoding, the image data is generated from the codestream of each tile of each component contrary to the time of coding. As shown in FIG. 1, in this case, the tag processing unit 115 interprets the tag information added to the codestream inputted from the exterior, and decomposes the codestream into the code stream of each tile of each component, and decoding processing is performed for every code data of each tile of each component.

The position of the bit set as the object of the decoding in the sequence based on the tag information in the codestream is defined. In the quantization/inverse-quantization unit 113, the context is generated from the list of the circumference bits (the decoding of which is already completed) of the object bit position.

In the entropy coding/decoding unit 114, the codestream is decoded by probability presumption from this context and the codestream so that the object bit is generated and it is written in the presumed position of the object bit.

The space division of the decoded data is carried out for every frequency band, and each tile of each component of the image data is restored in this way by performing the 2-dimensional wavelet inverse transformation at the 2-dimensional wavelet transform/inverse-transform unit 112. The restored data is transformed into the image data of the original color system at the color-space transform/inverse-transform unit 111.

The above description relates to the outline of the JPEG2000 algorithm that deals with the image processing method for a still picture, or a single frame. It is extended to the Motion-JPEG2000 algorithm which deals with the image processing method for a moving picture including a plurality of frames.

Figures 8, 9:
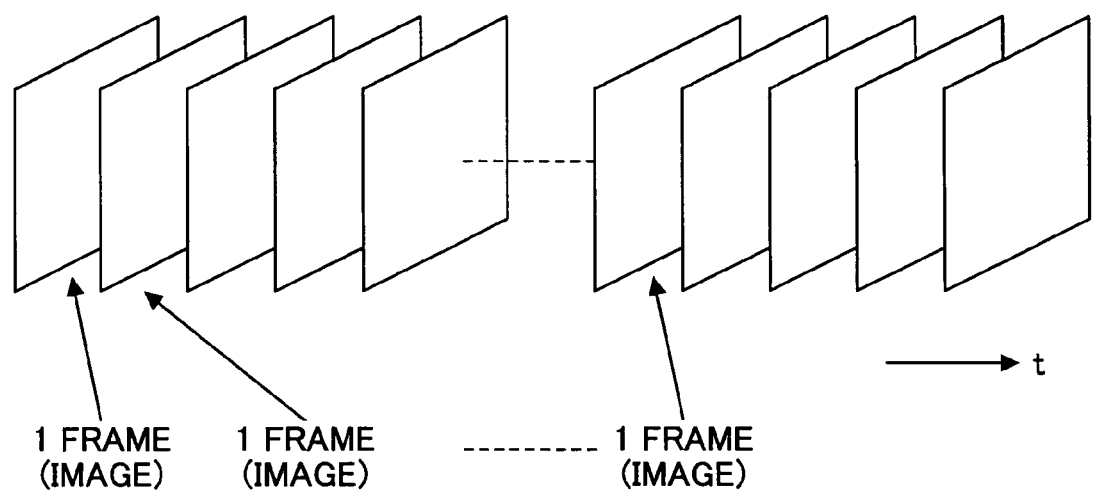
FIG. 8 is a diagram for explaining the principle of the Motion JPEG2000 algorithm.
FIG. 9 is a diagram for explaining the matrix of significance propagation pass including the eight neighboring coefficients.

Next, the motion picture compression or expansion technique which utilizes the Motion-JPEG2000 algorithm will be described. FIG. 8 is a diagram for explaining the principle of the Motion JPEG2000 algorithm.

As shown in FIG. 8, the moving picture is represented by displaying each JPEG2000 image of one frame continuously at a predetermined frame rate (which indicates the number of frames reproduced in unit time).

Next, a description will be given of the error resilience. The error resilience functions specified by the JPEG2000 will be explained briefly. The error resilience functions are provided for realizing error resilience which does not have a large influence on the reproduction even when the bit error occurs in the codestream, and they are classified into the error resilience method using the entropy coding and the error resilience method using the packet.

Specifically, there are the following six error resilience functions which are specified by the JPEG2000.

(1) Fixed Length Coding (code length is arranged)

(2) Vertically Casual Context

FIG. 9 shows the matrix of significance propagation pass including the eight neighboring coefficients. The circumference for the significance propagation pass (the coding of the insignificant coefficient which has the significant coefficients in the circumference thereof) is considered in order to make arithmetic coding speed high. As shown in FIG. 9, these are the method of creating the context model by setting the coefficient values D2, V1, and D3 to 0, and these coefficient values are among the eight neighboring coefficient values (D0, D1, D2, D3, V0, V1, H0, H1) for significance propagation pass.

(3) Termination on Ever Coding Pass (FDIS D.4 Table D-8)

(4) Synchronization by SOP Marker

Figure 10:
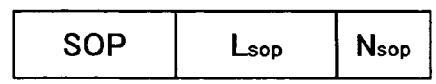
FIG. 10 is a diagram for explaining the composition of the SOP marker segment.

The SOP marker is one of the markers for aiming at improvement in error resilience (option), and it is the marker segment indicating the start of the packet. FIG. 10 shows an example of the composition of the marker segment. The SOP marker is composed of Lsop which describes the size of the marker segment concerned, and Nsop which describes the identification number of the packet.

(5) Reset the Context Probability (initialization of arithmetic encoder)

(6) Segmentation Symbol (addition)

As a method of error detection, in the case of encoding, the 4-bit (1010) segmentation symbol is encoded and it is added to the last of the codestream. In the case of decoding, when the segmentation symbol cannot be decoded correctly, it is determined that the error arises in the codestream.

A description will be given of the image processing apparatus of one preferred embodiment of the invention.

The image processing apparatus of the present embodiment is based on the above-described JPEG2000 algorithm. In the following, the image processing apparatus of the present embodiment will be explained as an example of application to a server which distributes the image data to a desired destination device (client) over the Internet. Namely, the server is provided to transmit a codestream through a transmission path over the Internet, and the codestream is created from an image by dividing the image into rectangular portions and performing a discrete wavelet transform, a quantization and an entropy encoding for the respective rectangular portions of the image according to the JPEG2000 algorithm.

Figure 11:
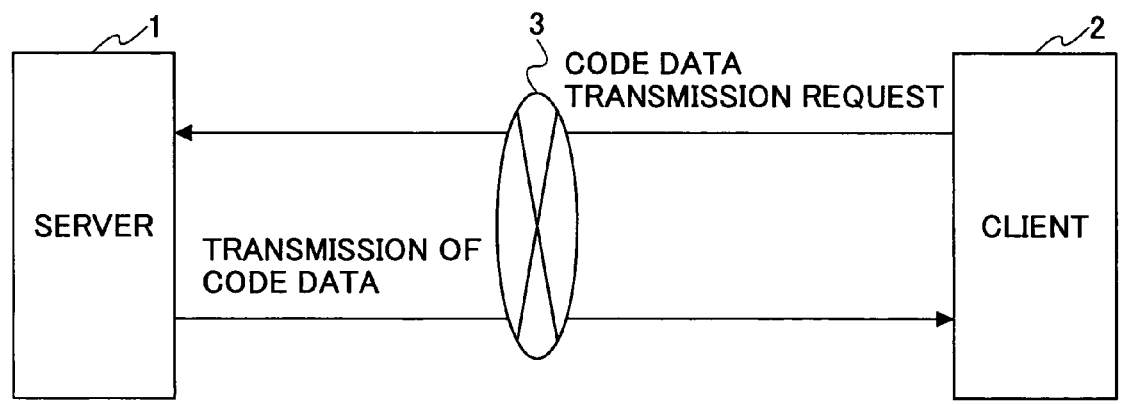
FIG. 11 is a diagram showing a system to which one embodiment of the present invention is applied.

FIG. 11 shows a network system including a client and a server to which one embodiment of the present invention is applied.

As shown in FIG. 11, the system includes the server 1 and the client 2. The client 2 sends a request of code data transmission to the server 1 via the network 3, which is a communication transmission path, such as the Internet, and receives the codestream from the server 1. The server 1 is the image processing apparatus which transmits the codestream through the network 3 to the client 2, and the codestream is created from an image by the compression encoding according to the JPEG2000 algorithm. Alternatively, the network 3 may be a wired or wireless communication network.

Figure 12:
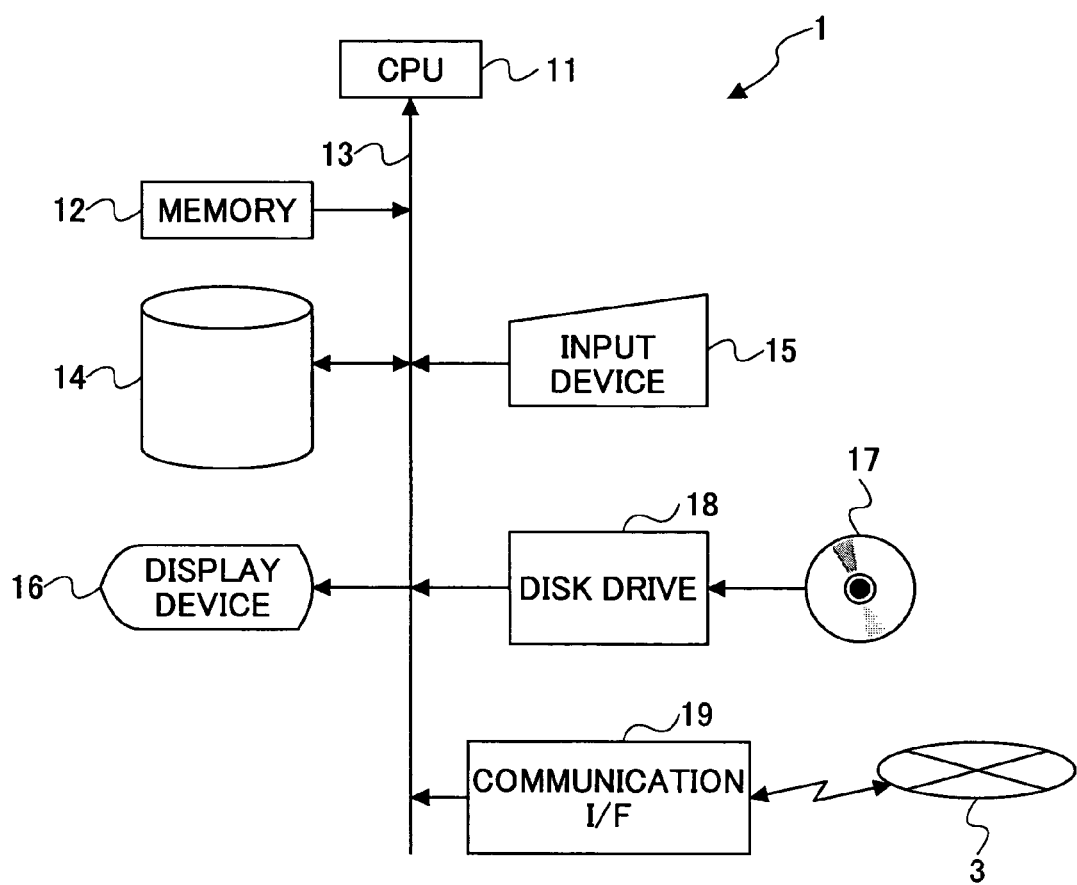
FIG. 12 is a block diagram showing the hardware composition of a server in the system of FIG. 11.

FIG. 12 shows the hardware composition of the server 1 in the communication system of FIG. 11.

As shown in FIG. 12, the server 1 is the image processing apparatus of the present embodiment, and it includes the CPU 11 which performs various logic and arithmetic operations and controls the respective elements of the server 1 intensively, and the memory 12 which includes the ROM and the RAM. The elements of the server 1 are connected through the interfaces by the bus 13.

The communication interface 19 is provided as a communication device which communicates with the network 3. The magnetic storage 14 is, for example, a hard disk drive (HDD). The input device 15 includes the mouse, the keyboard, etc. The display 16 is, for example, a LCD or CRT display. The disk drive 18 is provided as a storage-medium reader which reads an image processing program of the invention from the storage medium 17 which serves as the storage medium of the invention, such as an optical disk. These elements of the server 1 are connected to the bus 13 through the predetermined interfaces.

In addition, the storage medium 17 may be any of various kinds of media, such as an optical disk, a CD, a DVD, magneto-optical disk, and a FD. Moreover, the disk drive 18 may be any of various disk drives depending on the kind of storage medium 17. Specifically, one of an optical disk drive, a magneto-optical disk drive, a FD drive, etc. may be used as the disk drive 18.

Suppose that the image processing program of the present invention is stored in the magnetic storage 14. Generally, the image processing program is installed in the server 1 by reading it from the storage medium 17 by the disk drive 18. Alternatively, the image processing program may be downloaded from the network 3 and it may be installed into the magnetic storage 14.

By this installation, the server 1 of the present embodiment will be in the state where it can operate.

The image processing program may constitute a part of specific application software. Moreover, the image processing program may be a program which operates on a predetermined OS.

Figure 13:
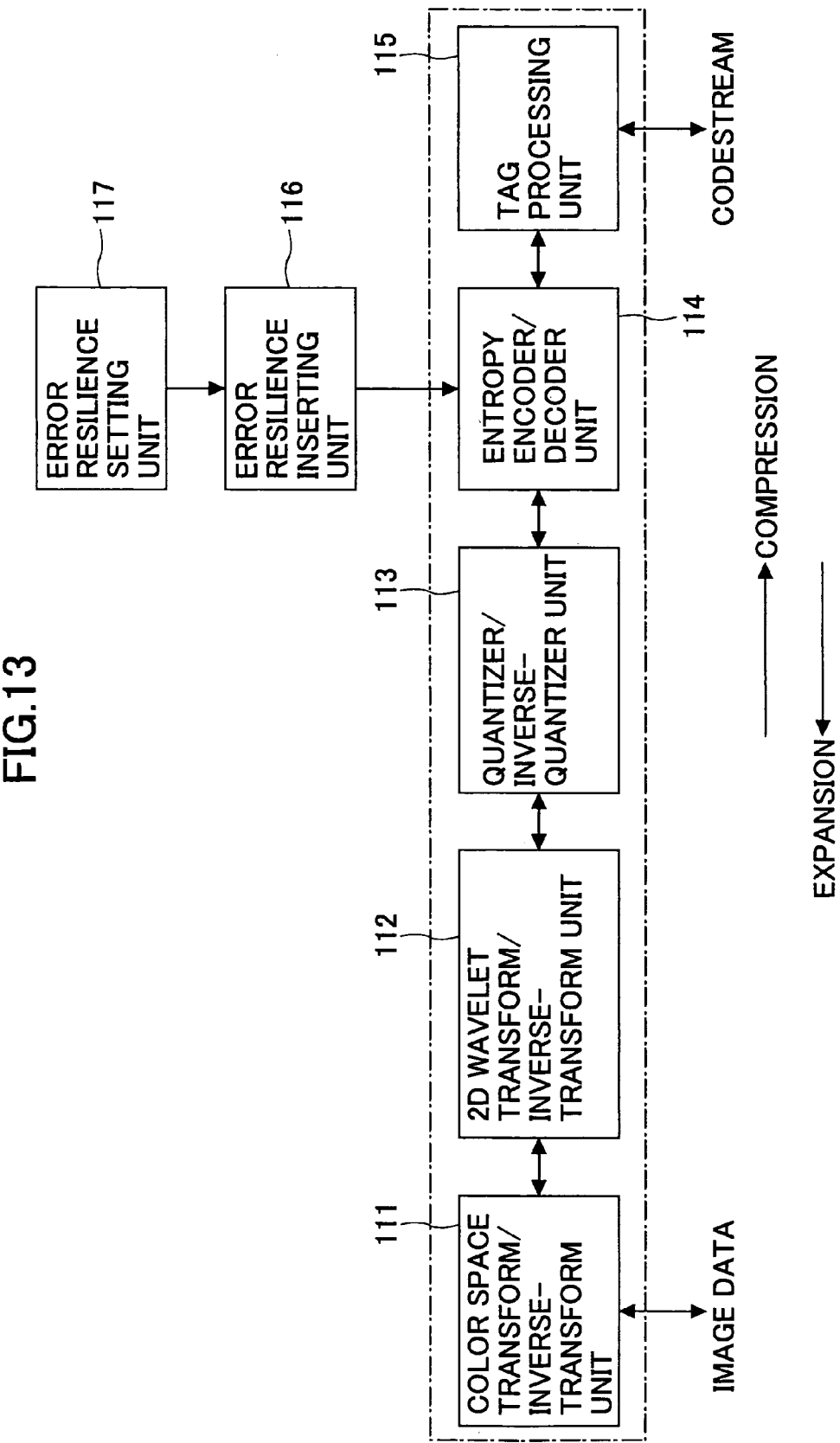
FIG. 13 is a block diagram of the image processing apparatus of one preferred embodiment of the invention.

The server 1 of the present embodiment has the above-described function of the JPEG2000 algorithm which is executed by the CPU 11. FIG. 13 shows the image processing apparatus of one preferred embodiment of the invention. As shown in FIG. 13, the image processing apparatus of one preferred embodiment further includes an error resilience inserting unit 116 and an error resilience setting unit 117, in addition to the elements 111-115 of the baseline image processing apparatus of FIG. 1.

As shown in FIG. 13, in the image processing apparatus of the present embodiment, the error resilience inserting unit 116 inserts error resilience to the respective code data of the rectangular portions of the image, prior to the entropy coding of the entropy coding/decoding unit 114 which creates the codestream.

The error resilience setting unit 117 sets intensities of the error resilience inserted to the respective code data for the error resilience inserting unit 116, so that the error resilience intensities are different according to predetermined base units of the respective code data in the codestream.

Figure 14:
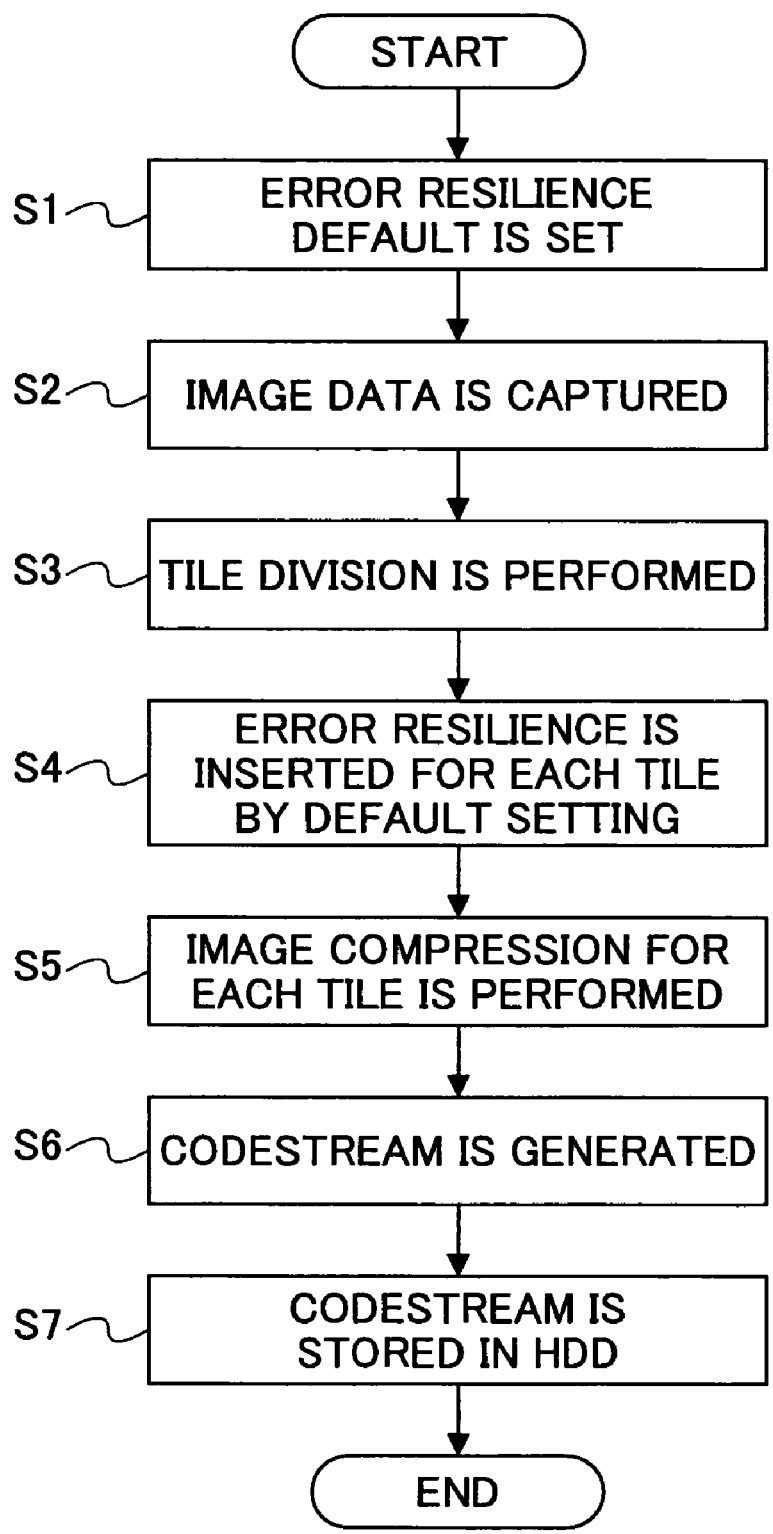
FIG. 14 is a flowchart for explaining an error resilience insertion process performed by the image processing apparatus of FIG. 13.

FIG. 14 shows the processing of the error resilience insertion performed by the CPU 11 based on the image processing program when the server 1 carries out the compression coding of image data and stores the codestream in the magnetic storage 14 (HDD).

A description will be given of the error resilience setting processing with reference to FIG. 14, FIG. 15A and FIG. 15B.

In the error resilience insertion processing of FIG. 14, the default setting of the error resilience intensities is automatically provided by the error resilience setting unit 117 (S1). The default setting of the error resilience intensities is, for example, such that the intensity of error resilience of the code data of the tile (rectangular portion) which constitutes the central part of the target image is relatively high as compared with the intensity of error resilience of the code data of the tile (rectangular portion) which constitutes the circumferential part of the image.

Namely, the intensity of error resilience of the code data of the tile (rectangular portion) which constitutes the central part is set up strongly, and the intensity of error resilience of the code data of the tile (rectangular portion) which constitutes the circumferential part is set up weakly or set to be zero (namely, the error resilience is not inserted).

Under the conditions in which the default setting of error resilience intensities is set at the step S1, the image data of concern for the compression encoding is captured through the scanner etc. (S2). The tile division of the image data is performed through the processings of the color-space transform/inverse-transform unit 111, the 2-dimensional wavelet transform/inverse-transform unit 112, and the quantizer/inverse-quantizer unit 113 (the bit-plane division unit is included), and the tiles are produced (S3).

Figures 15A, 15B:
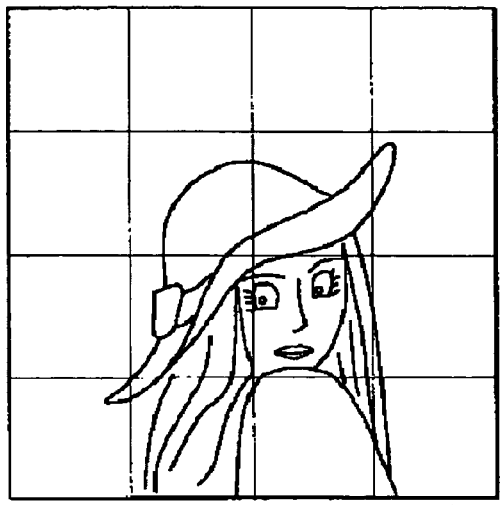
FIG. 15A and FIG. 15B are diagrams for explaining image processing of the image processing apparatus of FIG. 13.

FIG. 15A and FIG. 15B show an example of the image processing of the image processing apparatus of FIG. 13. In this example, the original image shown in FIG. 15A is divided into the 16 rectangular portions (the tile-0 through the tile-15) shown in FIG. 15B. After the step S3 is performed, according to the default setting of error resilience intensities, the error resilience is inserted to the code data of every tile at the tile position of that tile (S4).

In the present embodiment, the intensity of error resilience of the code data of the tile (rectangular portion) which constitutes the central part of the image is set to a relatively high level as compared with the intensity of error resilience of the code data of the tile (rectangular portion) which constitutes the circumferential part of the image. In the example of FIG. 15B, the intensity of error resilience of the code data of the tiles 5, 6, 9, and 10 (indicated by the dotted area) which constitute the central part of the image is set to a relatively high level, and the intensity of error resilience of the code data of the tiles 0, 1, 2, 3, 4, 7, 8, 11, 12, 13, 14 and 15 which constitute the circumferential part of the image is set to a low level or zero.

After the error resilience is inserted to the respective code data of the tile parts at the step S4, the image-encoding processing for every tile is performed by the entropy coding/decoding unit 114 (S5). Further, the processing by the tag processing unit 115 is performed so that the codestream is generated (S6). After the step S6 is performed, the codestream is stored in the HDD 14 (S7). The codestream stored in the HDD 14 can be transmitted from the server 1 to the client 2 via the network at any time when a request from the client 2 is received at the server 1.

Therefore, when a downloading request of image data from the client 2 is received at the server 1, as shown in FIG. 15(*b*), the codestream in which the high-intensity error resilience is inserted to the code data of the tile parts constituting the central part of the image and the low-intensity error resilience is inserted to the code data of the tile parts constituting the circumferential part of the image will be transmitted through the network 3 to the client 2.

Consequently, even when the congestion situation of the network 3 is not good, the codestream of the tiles 5, 6, 9, and 10 with the high-intensity error resilience can be transmitted safely, and the reproduction of the image such as the display of the image can be allowed for the client 2.

When a captured photographic image is considered, the image data of the central part of the image is more important than the image data of the circumferential part of the image. In the present embodiment, the error resilience setting unit 117 is provided such that the intensity of error resilience of the code data of the tiles 5, 6, 9, and 10 which constitute the central part of the image is set to a relatively high level, and the intensity of error resilience of the code data of the tiles 0, 1, 2, 3, 4, 7, 8, 11, 12, 13, 14 and 15 which constitute the circumferential part of the image is set to a low level or zero. Accordingly, the transmission of the image data of the central part which is more important can be performed safely according to the present embodiment.

In this case, it is not necessary to set the intensity of error resilience of the entire image data to the high level. The image processing apparatus of the present embodiment can realize the transmission of the codestream over the network with the necessary permissible quality of image being ensured and without increasing the transmission load and the transmission time so much.

The error resilience setting processing which has been explained with reference to FIG. 14, FIG. 15A and FIG. 15B is given as a typical example. Various modifications of the above embodiment may be made. For example, it is possible to use different error resilience functions for every tile. In such alternative embodiment, the single error resilience function of fixed length coding is applied to the respective code data of the tiles 0, 1, . . . which constitute the circumferential part of the image, and the two error resilience functions of fixed length coding and synchronization by SOP marker are applied to the respective code data of the tiles 5, 6, . . . which constitute the central part of the image.

Alternatively, the error resilience setting unit 117 may be provided such that according to a given combination of the error resilience functions, the intensity of error resilience is set to one of the seven levels 0-6(which will be described later). For example, in such alternative embodiment, the error resilience setting unit 117 is provided such that the intensity of the error resilience of the respective code data of the tiles 0, 1, . . . which constitute the circumferential part of the image is set to the level 0, and the intensity of the error resilience of the respective code data of the tiles 5, 6, . . . which constitute the central part of the image is set to the level 6.

Moreover, the rectangular portion used as the base unit for which error resilience is inserted is not limited to the tile. As previously described about the JPEG2000 algorithm, the rectangular portion may be the precinct, the code block or the packet. Therefore, more generally, the target image is divided into two or more rectangular portions, the function of the error resilience which is determined by numbering and which is used for every rectangular portion can be set up freely, or the intensity of error resilience can be set up freely.

Moreover, as an example which the intensity of error resilience is changed as a predetermined base unit according to the region (tile) component of the image concerned, and is set up in FIG. 14 and FIG. 15B.

Although the example which sets up relatively strongly the error resilience of the code data of the rectangular portion (tile) which constitutes the central part among the region (tile) of the image concerned as compared with the error resilience of the code data of the rectangular portion (tile) which constitutes the circumferential part is shown.

In addition, it is possible to make it, set up relatively strongly the error resilience of the code data of the rectangular portion (tile) which constitutes the character part among the region (tile) of the image concerned for example, as compared with the error resilience of the code data of the rectangular portion (tile) which constitutes the picture part.

What is necessary is to separate the character part and the picture part automatically using the pictorial symbol isolation adopted by the image processing of the MFP etc., and just to set up different error resilience for this processing, although it is possible to be the block definition by the user.

Since it can be understood that the contents in many cases if the image data of the character part is transmitted certainly when the pictorial symbol image is considered, the data transmission of the character part which becomes important is securable among the region of the image by setting up relatively strongly the error resilience of the code data of the rectangular portion (tile) which constitutes the character part as compared with the error resilience of the code data of the rectangular portion (tile) which constitutes the picture part.

Moreover, it is possible to make it set up relatively strongly the error resilience of the code data of the rectangular portion (tile), which constitutes the portrait image part among the regions of the image concerned as compared with the error resilience of the code data of the rectangular portion (tile) which constitutes the other image parts.

In many cases of photographic images captured by the digital camera, the focus will be on the person. For example, according to the focal position of the camera, the portrait image part and the other image parts are separated automatically, and the error resilience setting unit 117 can be provided to set different intensities of the error resilience to the code data in accordance with this processing.

Since it is common for the image data of the portrait image part to be important when the captured photographic image including the person etc. is considered, the data transmission of the central part which becomes important is securable among the region of the image by setting up relatively strongly the error resilience of the code data of the rectangular portion (tile) which constitutes the portrait image part as compared with the error resilience of the code data of the rectangular portion (tile) which constitutes the other image parts.

Moreover, not only that the intensity of error resilience is changed according to the region (tile) components of the image concerned, it is possible to make it set up that the intensity of error resilience is changed according to the quality-of-image components of the image concerned.

Specifically, it is possible to make it set up the intensity of error resilience of the code data belonging to the high order layers in the quality-of-image components of the image concerned relatively high as compared with the intensity of error resilience of the code data belonging to the low order layers.

When it encodes hierarchical according to the JPEG2000 algorithm, the influence which gives the data of the high order layers to the quality of the image is large. The data transmission of the high order layers which is important to the quality of the image can be secured by setting up the intensity of error resilience of the code data belonging to the high order layers relatively high as compared with the intensity of error resilience of the code data belonging to the low order layers.

Alternatively, it is possible to make it set up the intensity of error resilience of the code data (wavelet coefficient) belonging to the resolution LL component relatively high among the quality-of-image components of the image concerned as compared with the intensity of error resilience of the code data (wavelet coefficient) belonging to other resolution components.

The wavelet transformation is performed according to the JPEG2000 algorithm, and the influence to which the data of the LL component gives resolution level to the quality of the image when it encodes hierarchical, is large as shown in FIG. 3. In the alternative embodiment, it is possible to set up the intensity of error resilience of the code data (wavelet coefficient) belonging to LL component (or 1LL, 2LL, or 3LL according to the decomposition level), which has a large influence, relatively high as compared with the intensity of error resilience of the code data (wavelet coefficient) belonging to the other resolution components HL, LH and HH. By the setting of the error resilience intensity, the data transmission of LL component which has a large influence can be performed safely.

Furthermore, when the image concerned is a color image, it is possible to make the intensity of error resilience of the code data belonging to the brightness component relatively high among the quality-of-image components of the color image concerned as compared with the intensity of error resilience of the code data belonging to the color-difference components.

Figures 16, 17:
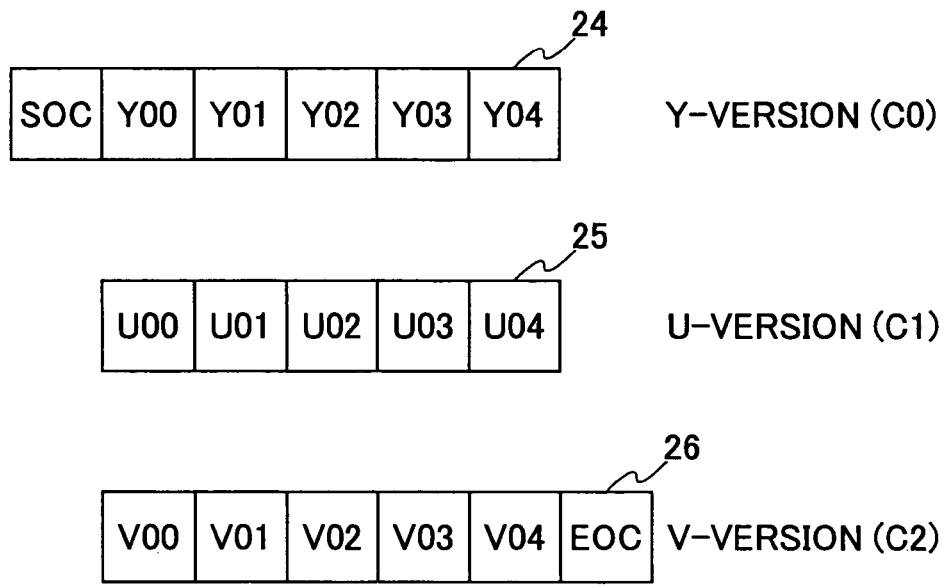
FIG. 16 is a diagram for explaining the color components of image data.
FIG. 17 is a diagram for explaining a ROI region.

FIG. 16 shows an example of the codestream of a still-image data, which includes the Y version code data 24 as the brightness component, and the U version code data 25 and the V version code data 26 as the color-difference components. According to the present embodiment, the intensity of error resilience of the Y version code data 24 which belongs to the brightness component is made relatively high as compared with the intensity of error resilience of the U version code data 25 and V version code data 26 belonging to the coloar-difference components.

The data transmission of the brightness component is more important than that of the color-difference components. This is because the influence of damaged brightness component on the quality of the resulting image is severer than the influence of damaged color-difference components on the quality of the resulting image. Hence, it is important to make the intensity of error resilience of the Y version code data 24 belonging to the brightness component relatively high as compared with the intensity of error resilience of the U version code data 25 and V version code data 26 belonging to the coloar-difference components.

Furthermore, it is possible to make the intensity of error resilience of the code data belonging to the ROI (Region Of Interest) region relatively high among the quality-of-image components of the image concerned as compared with the intensity of error resilience of the code data belonging to other regions.

FIG. 17 shows an example of the still image consisting of the 4×4 tiles T01-T16 in which the ROI region (indicated by reference numeral 22) exists in the central part of the image. In the present embodiment, the intensity of error resilience of the code data of the four tiles T06, T07, T10, and T11 of the center included in the ROI region 22 is made relatively high.

Also in the image, since the ROI region 22 is regarded as the important portion of the image, it is setting up relatively the error resilience of the code data belonging to the ROI region 22 strongly as compared with the error resilience of the code data belonging to other regions, and can secure the data transmission of the ROI region which becomes important.

Alternatively, the setting of the error resilience inserted to the tile components may be performed such that the intensity of the error resilience of the tiles of the central part of the image is set strongly, and the intensity of the error resilience of the tiles of the circumferential part is set weakly. In addition to the above-mentioned setting, the setting of the error resilience inserted to the layers may be performed such that the intensity of the error resilience of the high order layers is set strongly and the intensity of the error resilience of the lower order layers is set weakly as shown in FIG. 18.

In addition, there are $2^6$ combinations of the above-mentioned error resilience functions that can be used:

(1) Fixed Length Coding (code length is arranged)
(2) Vertically Casual Context
(3) Termination on Ever Coding Pass (FDIS D.4 Table D-8)
(4) Synchronization by SOP Marker
(5) Reset the Context Probability (initialization of arithmetic encoder)
(6) Segmentation Symbol (addition)

In the present embodiment, it is assumed that the intensity of error resilience is set to the seven different levels as follows.

Level 6: (1)+(2)+(3)+(4)+(5)+(6)
Level 5: (1)+(2)+(3)+(4)+(5)
Level 4: (1)+(2)+(3)+(4)
Level 3: (1)+(2)+(3)
Level 2: (1)+(2)
Level 1: (1)
Level 0: no error resilience Moreover, not only in the still picture but as shown in FIG. 19 (a), when the codestream is generated for every frame by the animation by which the image is captured with the digital still camera, the digital movie camera, etc., according to the frame of the dynamic image concerned, the intensity of error resilience is changed as a predetermined base unit, and it is possible to make it set up.

In this case, as compared with the error resilience of the code data belonging to other frames (indicated by the white areas), it is possible to more specifically set up relatively strongly the error resilience of the code data belonging to the frames (indicated by the dotted areas) which appears periodically as shown in FIG. 19(b).

The error resilience of the code data which belongs to the frames (indicated by the dotted areas) which appears irregularly as shown in FIG. 19(c) may be relatively set up strongly as compared with the error resilience of the code data belonging to other frames (indicated by the white areas).

The situation of change between the frames is checked and it is possible to make it set up relatively strongly the error resilience of the code data belonging to the frames (indicated by the dotted areas) which changed a lot as compared with the error resilience of the code data belonging to other frames (indicated by the white areas) as shown in FIG. 19(d).

Thus, if different error resilience for every frame is given, as much as possible, by insertion of the least possible amount of error resilience, the transmission of the frames with irregular or large changes can be achieved safely, and the data transmission of the dynamic image can be secured periodically.

Especially, the periodic method of FIG. 19(b) is suitable when there is much frequency in which the frame which change of the amount of motions produces appears, and the irregular method of FIG. 19(c) is suitable when the frequency in which the frame which change of the amount of motions produces appears is low.

Moreover, what is necessary for this is just to use the presence of change of the wavelet coefficients of LL component which shows most the presence of size change of the amount of codes between the frames, and the feature of the image concerned, the presence of change of the setup of the ROI region, etc., although it is required to check the situation of change between the frames when realizing the method shown in FIG. 19(d).

Furthermore, it is effective to change the intensity of the error resilience according to the congestion situation of the network 3. In order to realize this, a detection unit which detects the congestion state of the transmission path in the network 3 is required. This can be easily realized by using, for example, the "ping" command, which is a fundamental command that is used to detect whether the IP packet arrives at the destination location in the TCP/IP network.

Thus, the necessary minimum quality of image can be guaranteed without increasing the transmission load and the transmission time so much by weakening the intensity of the error resilience when the congestion situation is vacant and changing the intensity of the error resilience by taking into consideration the congestion situation of the network 3.

In the above-described embodiment, the image processing apparatus is applied to the server 1 on the Internet. However, the image processing apparatus of the present invention is applicable similarly to the personal computer connected to the printer or MFP via the communication transmission line, and the digital camera which captures not only still pictures but also moving pictures and outputs the captured image to the personal computer through the communication transmission line.

The present invention is not limited to the above-described embodiments, and variations and modifications may be made without departing from the scope of the present invention.

Further, the present invention is based on Japanese priority application No. 2002-336390, filed on Nov. 20, 2002, the entire contents of which are hereby incorporated by reference.

What is claimed is:

1. An image processing apparatus which transmits a codestream through a transmission path, the codestream being created from an image by dividing the image into rectangular portions and performing a discrete wavelet transform, a quantization and an entropy encoding for the respective rectangular portions of the image, the image processing apparatus comprising:
   an error resilience inserting unit inserting error resilience to respective code data of the rectangular portions prior to the entropy coding; and
   an error resilience setting unit setting intensities of the error resilience inserted to the respective code data for the error resilience inserting unit, so that the error resilience intensities are different according to base units of the respective code data.

2. The image processing apparatus of claim 1 wherein the error resilience setting unit sets the intensities of the error resilience so that the error resilience intensities are different according to respective portions of the image.

3. The image processing apparatus of claim 2 wherein the error resilience setting unit sets the intensities of the error resilience so that an intensity of the error resilience inserted to code data of the rectangular portions constituting a character part of the image is higher than an intensity of the error resilience inserted to code data of the rectangular portions constituting a picture image part of the image.

4. The image processing apparatus of claim 1 wherein the error resilience setting unit sets the intensities of the error resilience so that an intensity of the error resilience inserted to code data of the rectangular portions constituting a central part of the image is higher than an intensity of the error resilience inserted to code data of the rectangular portions constituting a circumferential part of the image.

5. The image processing apparatus of claim 1 wherein the error resilience setting unit sets the intensities of the error resilience so that an intensity of the error resilience inserted to code data of the rectangular portions constituting a portrait image part of the image is higher than an intensity of the error resilience inserted to code data of the rectangular portions constituting other image parts of the image.

6. The image processing apparatus of claim 1 wherein the error resilience setting unit sets the intensities of the error resilience so that the error resilience intensities are different according to quality-of-image components of the code data.

7. The image processing apparatus of claim 6 wherein the error resilience setting unit sets the intensities of the error resilience so that an intensity of the error resilience inserted to code data belonging to a high order layer of the quality-of-image components is higher than an intensity of the error resilience inserted to code data belonging to a low order layer of the quality-of-image components.

8. The image processing apparatus of claim 6 wherein the error resilience setting unit sets the intensities of the error resilience so that an intensity of the error resilience inserted to code data belonging to an LL component of the quality-of-image components is higher than an intensity of the error resilience inserted to code data belonging to other components of the quality-of-image components.

9. The image processing apparatus of claim 6 wherein the error resilience setting unit sets the intensities of the error resilience so that an intensity of the error resilience inserted to code data belonging to a brightness component of the quality-of-image components is higher than an intensity of the error resilience inserted to code data belonging to a color-difference component of the quality-of-image components.

10. The image processing apparatus of claim 6 wherein the error resilience setting unit sets the intensities of the error resilience so that an intensity of the error resilience inserted to code data belonging to a ROI component of the quality-of-image components is higher than an intensity of the error resilience inserted to code data belonging to other components of the quality-of-image components.

11. The image processing apparatus of claim 1 wherein the image includes a plurality of frames and the codestream is created from each of the plurality of frames, and wherein the error resilience setting unit sets the intensities of the error resilience so that the error resilience intensities are different according to the frames of the code data.

12. The image processing apparatus of claim 11 wherein the error resilience setting unit sets the intensities of the error resilience so that an intensity of the error resilience inserted to code data belonging to a periodically appearing frame of the plurality of frames is higher than an intensity of the error resilience inserted to code data belonging to other frames of the plurality of frames.

13. The image processing apparatus of claim 11 wherein the error resilience setting unit sets the intensities of the error resilience so that an intensity of the error resilience inserted to code data belonging to an irregularly appearing frame of the plurality of frames is higher than an intensity of the error resilience inserted to code data belonging to other frames of the plurality of frames.

14. The image processing apparatus of claim 11 wherein the error resilience setting unit sets the intensities of the error resilience so that an intensity of the error resilience inserted to code data belonging to a greatly changed frame of the plurality of frames is higher than an intensity of the error resilience inserted to code data belonging to other frames of the plurality of frames.

15. The image processing apparatus of claim 1 further comprising a detection unit detecting a congestion state of the transmission path, wherein the error resilience setting unit is provided to change the setting of the intensities of the error resilience according to a detected congestion state of the transmission path.

16. The image processing apparatus of claim 1 wherein the error resilience setting unit sets the intensities of the error resilience so that the error resilience intensities are different according to respective tiles of the image.

17. The image processing apparatus of claim 1 wherein the error resilience setting unit sets the intensities of the error resilience so that the error resilience intensities are different according to respective precincts of the image.

18. The image processing apparatus of claim 1 wherein the error resilience setting unit sets the intensities of the error resilience so that the error resilience intensities are different according to respective code-blocks of the image.

19. The image processing apparatus of claim 1 wherein the error resilience setting unit sets the intensities of the error resilience so that the error resilience intensities are different according to respective packets of the image.

20. A computer-readable storage medium storing a program embodied therein for causing a computer of an image processing apparatus to execute an image processing method which transmits a codestream through a transmission path, the codestream being created from an image by dividing the image into rectangular portions and performing a discrete wavelet transform, a quantization and an entropy encoding for the respective rectangular portions of the image, the method comprising steps of:
  inserting error resilience to respective code data of the rectangular portions prior to the entropy coding; and
  setting intensities of the error resilience inserted to the respective code data for the error resilience inserting step, so that the error resilience intensities are different according to base units of the respective code data.

* * * * *